Figure 1:
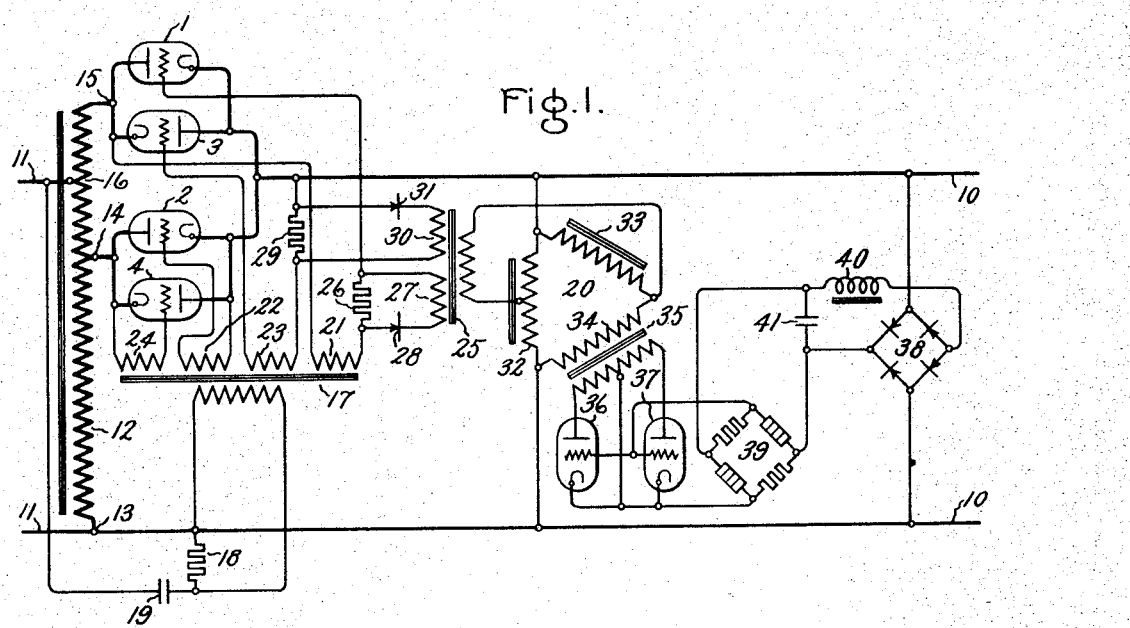

June 13, 1933.  B. D. BEDFORD  1,914,193
ELECTRICAL REGULATING CIRCUIT
Filed April 27, 1931    2 Sheets-Sheet 1

Inventor:
Burnice D. Bedford,
by Charles E. Mullen
His Attorney

June 13, 1933.   B. D. BEDFORD   1,914,193
ELECTRICAL REGULATING CIRCUIT
Filed April 27, 1931   2 Sheets-Sheet 2
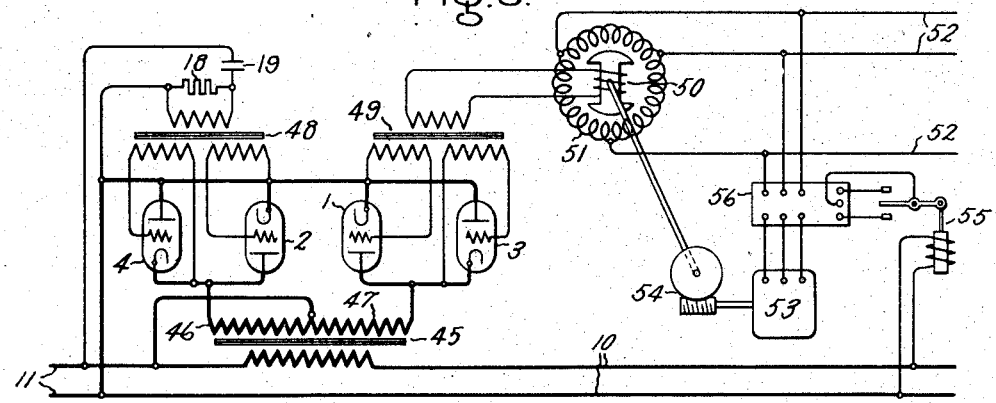
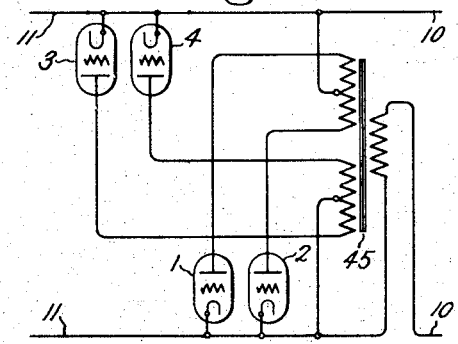
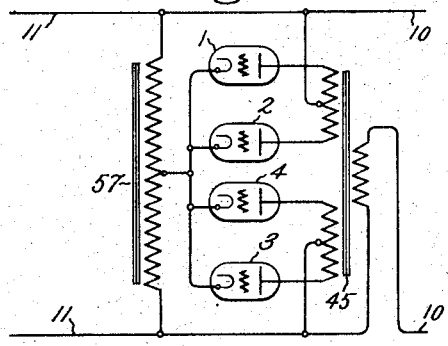
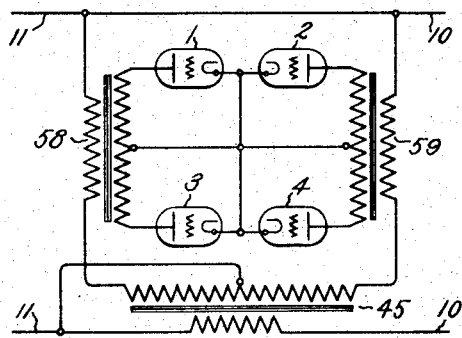
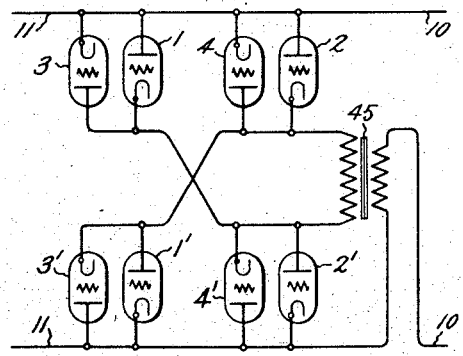
Inventor:
Burnice D. Bedford,
by Charles E. Tullar
His Attorney.

Patented June 13, 1933

1,914,193

UNITED STATES PATENT OFFICE

BURNICE D. BEDFORD, OF SCHENECTADY, NEW YORK, ASSIGNOR TO GENERAL ELECTRIC COMPANY, A CORPORATION OF NEW YORK

ELECTRICAL REGULATING CIRCUIT

Application filed April 27, 1931. Serial No. 533,177.

My invention relates to electrical regulating circuits and more particularly to such circuits utilizing electric valves which are suitable for regulating the voltage or other electrical condition of an alternating current feeder circuit.

In a copending application of Aram Boyajian, Serial No. 530,880, filed April 17, 1931, and assigned to the same assignee as the present application, there is disclosed an arrangement utilizing electric valves for regulating the voltage of an alternating current feeder circuit in which the desired regulation is effected by periodically transferring a load current between a plurality of valve paths at intervals of every few half cycles, the valve paths being associated with points of the supply circuit at different electrical potentials. My invention constitutes an improvement upon the arrangement shown in that application by means of which much closer regulation can be obtained.

It is an object of my invention to provide an improved electrical regulating apparatus utilizing electric valves and a method of operating the same which is particularly suitable for regulating an electrical condition of an alternating current feeder circuit and by means of which any desired fineness of regulation may be obtained over wide variations in load conditions.

It is another object of my invention to provide an improved electrical regulating apparatus including electric valves and a method of operating the same which is particularly suitable for regulating an electrical condition of an alternating current feeder circuit and in which the load current is automatically transferred between several valve paths at different electrical potentials at a point in each half cycle of alternating potential dependent upon existing load conditions.

It is a further object of my invention to provide an improved grid control circuit for electric valves which is of general application, but which is particularly suitable for controlling the electric valves utilized in my improved regulating apparatus.

In accordance with my invention an alternating current feeder circuit is connected with an alternating current supply circuit through a series or booster transformer and a plurality of electric valves so associated with the windings of the transformer as to vary the amount of buck or boost supplied by it. The load current is transferred from a valve path corresponding to a buck condition to a valve path corresponding to a boost condition at an intermediate point of each half cycle of alternating potential, the particular point in each half cycle at which this transfer is effected being dependent upon the average value of the voltage or other electrical condition of the regulated circuit. The point in the successive half cycles at which current is transferred between the valve paths is determined by controlling the phase relation between the grid and anode potentials of the valves associated with the circuit adapted to give the maximum boost; that is, during the initial portion of each half cycle of alternating potential, current flows in the valve paths corresponding to the minimum boost or maximum buck condition and is transferred to the valve paths corresponding to the maximum boost condition at the point determined by the average value of the electrical condition of the load circuit which is being regulated. When operating under certain power factor conditions, it has been found necessary to excite the grids of the valve associated with the circuit adapted to give the maximum boost with an alternating grid potential in which the positive half wave exceeds 180 electrical degrees. In accordance with my invention this excitation is obtained by superimposing upon a grid potential of fixed phase relation a rectified alternating potential variable in phase.

Figures 2, 3:
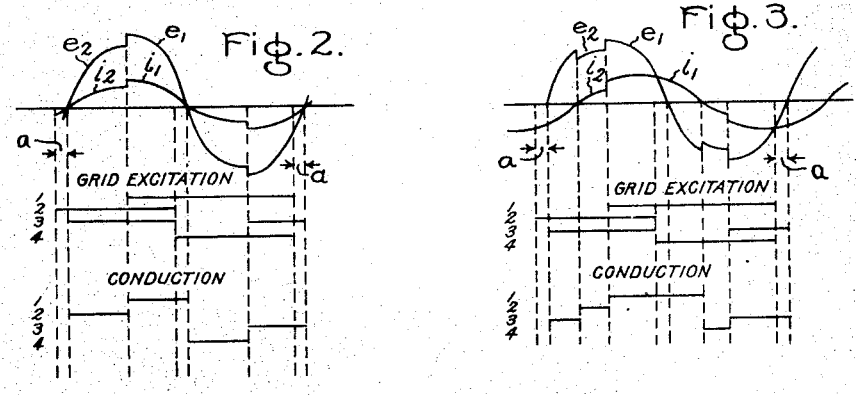
Figure 4:
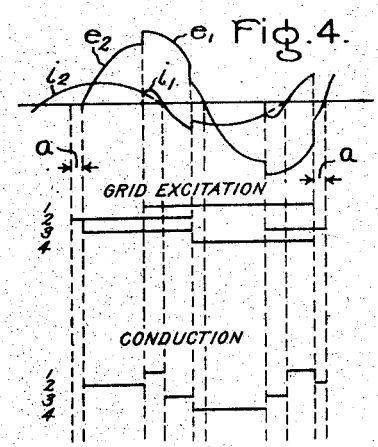

For a better understanding of my invention, together with other and further objects thereof, reference is had to the following description taken in connection with the accompanying drawings and its scope will be pointed out in the appended claims. Referring to the drawings, Fig. 1 illustrates one embodiment of my invention for maintaining constant the voltage of an alternating current feeder circuit; Figs. 2, 3 and 4 represent voltage and current wave forms obtained by means of the apparatus illustrated in Fig. 1 under conditions of unity, lagging and leading power factor respectively; Fig. 5 represents a modification of my invention in which the desired regulation is effected by an electro-mechanical control system, while Figs. 6, 7, 8 and 9 show certain modifications of the power circuit of the regulating apparatus.

Referring now to Fig. 1 of the drawings, there is illustrated an arrangement for maintaining constant the voltage of an alternating current feeder circuit 10 supplied from an alternating current supply circuit 11 through an improved electrical regulating apparatus embodying my invention. This apparatus includes an auto-transformer 12 provided with an end tap 13 common to the supply and feeder circuits, an intermediate tap 16 for connection to the other side of the supply circuit, a lower potential or bucking tap 14, and a higher potential or boosting tap 15. The feeder circuit 10 is connected to the boosting tap 15 through a pair of electric valves 1 and 3, reversely connected in parallel, and to the bucking tap 14 through a pair of electric valves 2 and 4, also reversely connected in parallel. Each of the electric valves 1 to 4 inclusive is provided with an anode, a cathode and a control grid and is preferably of the vapor electric discharge type. The grids of electric valves 1 to 4 inclusive are energized from the secondary windings 21 to 24 respectively, of a grid transformer 17 the primary winding of which is energized from the alternating current supply circuit 11 through any suitable arrangement for advancing the phase by a small angle, such for example as a resistor 18 and a capacitor 19 serially connected across the circuit 11. In order to control the phase relation of the grid potentials of electric valves 1 and 3 there is provided a phase shifting circuit 20, the output of which is connected to the primary winding of a grid transformer 25. Included in the grid circuit of electric valve 1 is a resistor 26 through which the positive half cycles of an alternating potential variable in phase is introduced from the secondary winding 27 through a unilaterally conductive device shown as a contact rectifier 28. Similarly, a resistor 29, connected in the grid circuit of electric valve 3, is energized from a secondary winding 30 of the transformer 25 through a contact rectifier 31. The phase shifting arrangement 20 may be of any of the several types well known in the art, but I have shown by way of example an impedance phase shifting circuit comprising an inductive winding 32 connected across the load circuit 10 and provided with an electrical midpoint, a reactor 33, and the primary winding 34 of a transformer 35 serially connected across inductive winding 32. The primary winding of grid transformer 25 is connected between the midpoint of inductive winding 32 and the junction between the reactor 33 and the winding 34. The secondary winding of the transformer 35 is short circuited through a pair of electric valves 36 and 37 so as to give the winding 34 a resistance characteristic. Electric valves 36 and 37 are each provided with an anode, a cathode and a control grid and are preferably of the high vacuum, pure electron discharge type. These valves may be controlled by any suitable arrangement responsive to the electrical condition of the circuit 10 which is to be regulated but I have shown by way of example a voltage control circuit of the so-called engine governor type. However, this control circuit per se forms no part of my present invention, but is disclosed and broadly claimed in a copending application of Alan S. FitzGerald, filed April 17, 1931, Serial No. 530,895 and assigned to the same assignee as the present application. In brief, this control circuit comprises a rectifier bridge, one diagonal of which is energized from the load circuit 10 and a resistance bridge 39 connected to the other diagonal of the rectifier bridge through any suitable combination for smoothing out the ripples in the rectified current supplied by the bridge 38, such for example as a series connected reactor 40 and a parallel connected capacitor 41. The bridge 39 may be any of the several well known combinations of resistances of dissimilar current-resistance characteristics. The grids of the valves 36 and 37 are energized from the output diagonal of the bridge 39.

The operation of the above described apparatus will be understood more clearly by reference to Fig. 2 which illustrates certain voltage and current wave forms of the apparatus when supplying a unity power factor load. In explaining the operation of the power circuit described above the operation of the electric control circuit for furnishing the grid excitation of the several electric valves will be neglected and it will be assumed that the desired grid excitation is provided. It will also be assumed that, initially, the terminals 14 and 15 of the transformer 12 are positive with respect to the terminal 13 and that the grid potentials of the valves 1 and 3 are retarded substantially 90 degrees with respect to their anode potentials. Under these conditions valve 2 will be conducting initially and will continue to conduct for substantially 90 electrical degrees when the grid of electric valve 1 will become positive to render it conducting and the current in the valve 2 will be transferred to the valve 1. The valve 1 will carry current for the remainder of the half cycle. In Fig. 2 the curve $e_2$ represents the voltage of the tap 14 which is impressed upon the load circuit 10 for the first portion of the half cycle and the curve $e_1$ represents the voltage of the tap 15 which is impressed upon the circuit for the last portion of the half cycle, the curves $i_2$ and $i_1$ representing the corresponding current values of the valves 2 and 1, respectively. It will be noted that, during the latter portion of this half cycle both valves 1 and 2 have positive grid excitation. However that portion of the transformer winding between the terminals 14 and 15 will not be short circuited because of the fact that a short circuit current would tend to flow in electric valve 2 in a direction opposite to that in which it is conductive. Similarly, during the next half cycle when the polarity of the winding 12 is reversed, current flows in the initial portion of the half cycle in electric valve 4 associated with the lower potential tap and is transferred to electric valve 3 associated with the higher potential tap at a corresponding point in this negative half cycle, this point depending, of course, upon the angle of phase shift of the grid potential of the valves 1 and 3. Below the curves of Fig. 2 is given a chart showing the relative intervals during which the grids of the several valves have positive excitation and the intervals during which the several valves are conductive. It will be noted that the grid excitation supplied the several electric valves by the grid transformer 17 has been advanced by the small commutating angle $a$ so that valves 1 and 4 and 2 and 3 are simultaneously conductive for this interval at the end of each half cycle. This would normally tend to produce a short circuit upon the transformer winding 12, but due to the fact that it occurs only for the last few electrical degrees of each half cycle when the instantaneous voltages are relatively small, it has been found to give no appreciable trouble.

In Fig. 3 are illustrated certain wave forms which occur when the apparatus is supplying a lagging power factor load. Under these conditions, at the beginning of the positive half cycle of the upper terminals of the winding 12, electric valve 3 will still be carrying current of the previous half cycle which has not yet reversed polarity. When the current reverses polarity it will be noted that the valve 2 is conductive and the current is transferred from the high potential tap to the low potential tap following the curve $i_2$, the voltage being represented by the curve $e_2$. About the middle of the half cycle of alternating potential, the grid of valve 1 becomes positive and the current is commutated from the valve 2 to the valve 1, the current following the curve $i_1$ and the voltage the curve $e_1$. The valve 1 will continue to conduct current after the alternating potential has reversed polarity as in the previous half cycle. When the load current reverses polarity, the valve 4 will conduct the current during the initial portion until it is transferred to the valve 3 as when operating at unity power factor. Under these conditions it will be noted that there is no grid control over the current during the interval corresponding to the angle of lag of the load current so that it is not possible to maintain the maximum buck condition. However, under ordinary operating conditions the amount of boost obtained during the initial portion of each half cycle will be compensated for by a decrease in the amount of boost ordinarily required in the latter portion of each half cycle.

In Fig. 4 there is illustrated certain operating characteristics of the apparatus of Fig. 1 when supplying a leading power factor load. Under these conditions the bucking tube 2 is conducting during the initial portion of the first half cycle and at substantially the middle of this half cycle the current is transferred from the tube 2 to the boosting tube 1 as in the previous cases. When the current reverses polarity, it will be transferred from the tube 1 to the tube 3 which is conductive in an opposite direction but also associated with the higher voltage terminal. Under these conditions, however, it is not possible to allow the tube 3 to conduct until the alternating current reverses polarity as in the previous cases, because of the fact that after the current has reversed polarity and the current is also flowing in opposite direction, it would be impossible to transfer the current at the beginning of the next half cycle of alternating potential to a tube associated with a lower voltage tap. It is for this reason that the grid excitation of all the valves is advanced by the small angle $a$ as illustrated in Figs. 2, 3 and 4. With this arrangement, tube 4 becomes conducting a small interval before the alternating potential reverses polarity, and, as may be seen by reference to Fig. 1, the cathode of the valve 3 becomes positive with respect to its anode and current in this valve is immediately interrupted. As in the previous instances, there will be a short circuit of the transformer winding through the valves 1 and 4 but due to the fact that this commutating angle is very small, this short circuit current will not build up to a dangerous value. This commutating angle is preferably only a few electrical degrees, and has been exaggerated in Figs. 2, 3 and 4 in order to illustrate more clearly the operation of the apparatus. During the negative half cycle of alternating potential the above described cycle is repeated with the substitution of electric valves of opposite polarity. Under the last described conditions, it will be noted that electric valves 1 and 3 are required to carry current for an interval during both half cycles of alternating potential so that it is necessary to provide a grid excitation of more than 180 electrical degrees duration and in order to obtain the maximum control this excitation should preferably be variable from 180 electrical degrees to substantially 360 electrical degrees. It will be noted that this extended grid excitation causes no difficulty when supplying unity or lagging power factor load as depicted in Figs. 2 and 3 since under these conditions, neither of the electric valves 1 and 3 is required to conduct current in opposition to the impressed electromotive force. While I have illustrated my invention as applied to an auto-transformer with two secondary taps, it will be obvious to those skilled in the art that it may be extended to a system having any desired number of bucking and boosting taps without departing from my invention.

The manner in which the above described grid excitation may be supplied will now be described. It will be apparent from the above description of the apparatus that the grids of the valves 2 and 4 receive alternating potentials slightly leading their anode potentials and that such components of potential are also supplied to the grids of the valves 1 and 3. The phase shifting arrangement 20 supplies an alternating potential variable in phase in response to variations of the voltage of the load circuit 10, and this potential supplied to the resistors 26 and 29 through the rectifiers 28 and 31 respectively, results in adding only the positive half waves of the alternating potential in the grid circuits of the valves 1 and 3, the effect of which is to extend the period of positive grid excitation as illustrated in Figs. 2, 3 and 4. The manner in which the variable phase alternating potential is supplied by the phase shifting arrangement 20 in response to variations in the voltage of the circuit 10 is explained in detail in the above mentioned FitzGerald application. In brief, the rectifier bridge 38 in conjunction with the reactor 40 and capacitor 41 supplies a unidirectional potential varying in accordance with variations in the alternating potential of the circuit 10. This unidirectional potential is impressed upon a resistance bridge including dissimilar resistance elements having dissimilar current-resisting characteristics. The unbalance voltage of this bridge greatly magnifies variations in the voltage of the alternating current circuit 10 and these magnified variations are impressed upon the grids of the valves 36 and 37 to control their conductivity. The conductivity of the valves 36 and 37 determines the effective resistance of the primary winding 34 of the transformer 35 and thus the phase relation of the potential applied to the grid transformer 25, as is well understood by those skilled in the art.

In Fig. 5 there is illustrated a modification of the power circuit of my improved regulating apparatus together with a simplification of the grid control of the several electric valves: In this arrangement the auto-transformer 12 of Fig. 1 is replaced by a series transformer 45 provided with a bucking winding 46, a boosting winding 47, and a secondary winding interconnecting the alternating current supply circuit 11 and the load circuit 10. As in the previous arrangement, electric valves 1 and 3 are associated with the boosting winding and electric valves 2 and 4 with the bucking winding of the series transformer 45. The grids of electric valves 2 and 4 are energized from the secondary winding of a grid transformer 48, the primary winding of which is connected to the supply circuit 11 through a phase advancing arrangement comprising a resistor 18 and capacitor 19, as in the arrangement illustrated in Fig. 1. The grids of electric valves 1 and 3 are energized from a pair of secondary windings of a grid transformer 49, the primary winding of which is energized from the secondary member 50 of a rotary phase shifting transformer 51, energized from any suitable polyphase circuit 52, synchronized with the load circuit 10 or energized directly from the load circuit 10 through any suitable phase splitting arrangement. The position of the secondary member 50 of the phase shifting transformer 51 and thus the phase of the alternating potential supplied to the grid transformer 49 is controlled by a motor 53 and associated driving gear 54. The direction of rotation of the motor 53 may be reversed in response to variations in the voltage of the feeder circuit 10 by a contact-making voltmeter 55 and any suitable reversing mechanism, such as a reversing switch 56. The operation of this arrangement is substantially similar to that described in connection with Fig. 1, the points in the cycle of alternating potential at which current is transferred from the valves associated with the bucking winding 46 to the valves associated with the boosting winding 47 determining the average voltage of the load circuit 10. It will be noted that in this arrangement a sine wave of alternating grid potential is applied to the grids of valves 1 and 3 rather than the extended excitation utilized in the arrangement of Fig. 1. Excitation of this type is the full equivalent of that shown in Fig. 1 in case the apparatus is supplying a unity or lagging power factor load. However, when the load has a leading power factor, none of the valves will be conductive during the interval between the time when the load current reverses polarity and the initial point of the commutating angle. This is due to the fact that only a single one of the valves 1 and 3 are conductive at any given instant so that when the current tends to reverse polarity it is interrupted in one of these valves and cannot restart until the beginning of the commutating angle, at which time one of the bucking tubes is made conductive.

In the arrangement shown in Fig. 1 it will be noted that the inverse voltage on each electric valve, that is, the voltage tending to send a reverse current through the valve when it is not conductive, is only the difference between the buck and the boost voltages, which, assuming a ten per cent buck and a ten per cent boost, is twenty per cent of the applied voltage. In this arrangement there are three different cathode potentials which, in certain instances may be undesirable because of certain insulating problems in both the filament and grid circuits. The electric valves in this arrangement each carry full load current. In the arrangement shown in Fig. 5, however, each of the electric valves under similar conditions of buck and boost, will carry only ten per cent of the load current but will be subjected to an inverse voltage substantially twice that of the input voltage. As in the other arrangements there are three different cathode potentials. In Figs. 6 and 9 inclusive, there are illustrated various rearrangements of the power circuits of my regulating apparatus which make it readily adaptable for various operating conditions. In each of these arrangements corresponding electric valves are given corresponding reference numerals and either of the grid control circuits illustrated in the arrangements of Fig. 1 and Fig. 2 may be used in exactly the same manner.

For example, in Fig. 6, the boosting transformer 45 is provided with two insulated primary windings each having a bucking and boosting portion in order that the number of cathode potentials may be reduced to two. In Fig. 7 an additional auto-transformer 57 is provided and the cathodes of all of the electric valves are connected to its midpoint; otherwise the arrangement is the same as Fig. 6. In this way the number of cathode potentials may be reduced to one at the expense of a slight increase in transformer rating. Fig. 8 illustrates another modification of the arrangement shown in Fig. 5 in which the series transformers 58 and 59 are connected in circuit with the primary boosting and bucking windings of the transformer 45. The secondary windings of the transformers 58 and 59 are short-circuited through electric valves 1 to 4 inclusive. In this manner the number of cathode potentials is reduced to one and in addition the several electric valves may be operated at any desired voltage rating. A still further modification is shown in Fig. 9 in which four additional electric valves 1' to 4' are required. These valves will receive the same grid excitation as the corresponding valves 1 to 4 inclusive. This arrangement has the advantage that the transformer rating is reduced below that of any of the other several arrangements. In brief, the various circuit characteristics of the several arrangements illustrated in Figs. 1 and 5 to 9 inclusive, may be compared by reference to the following table:

| Figure | Transformer rating % kva. output | Inverse valve voltage % input voltage | Number cathode potentials |
|---|---|---|---|
| 1 | 15 | 20 | 3 |
| 5 | 15 | 200 | 3 |
| 6 | 19 | 200 | 2 |
| 7 | 24 | 100 | 1 |
| 8 | 39 | Any value. | 1 |
| 9 | 10 | 100 | 4 |

While I have described what I at present consider to represent the preferred embodiments of my invention, it will be obvious to those skilled in the art that various changes and modifications may be made without departing from my invention and I therefore aim in the appended claims to cover all such changes and modifications as fall within the true spirit and scope of my invention.

What I claim as new and desire to secure by Letters Patent of the United States, is:

1. In a feeder regulator system, an alternating current supply circuit, an alternating current load circuit, an inductive winding for determining the relative potentials of said circuits, a plurality of electric valves interconnecting said circuits through said winding, and means for transferring the load current between said valves at any desired point in the cycle of alternating potential for regulating the average voltage of said load circuit.

2. In a feeder regulator system, an alternating current supply circuit, a transformer winding provided with a plurality of electrically spaced terminals, a plurality of electric valves associated with certain of said terminals, an alternating current load circuit connected to said supply circuit through said winding and valves, and means for transferring the load current from a valve associated with a terminal of lower potential to a valve associated with terminal of higher potential at any desired point in the cycle of alternating potential to regulate the average voltage of said load circuit.

3. In a feeder regulator system, an alternating current supply circuit, an alternating current load circuit, an inductive winding for determining the relative potentials of said circuits, a plurality of electric valves interconnecting said circuits through said winding, and means responsive to an electrical condition of said load circuit for transferring the load current between said valves at any desired point in the cycle of alternating potential for regulating the average voltage of said load circuit.

4. In a feeder regulator system, an alternating current supply circuit, an alternating current load circuit, means for transmitting energy therebetween including a plurality of electric valves and a booster transformer provided with a series winding interconnecting said circuits, and means for transferring the load current between the several electric valves at any desired point in the cycle of alternating potential to regulate the average voltage of said load circuit.

5. In a feeder regulator system, an alternating current supply circuit, an alternating current load circuit, means for transmitting energy therebetween including a booster transformer provided with a plurality of electrically spaced terminals and a secondary winding interconnecting said circuits, a plurality of electric valves associated with said terminals, and means for transferring the load current from a valve associated with a terminal of lower potential to a valve associated with a terminal of higher potential at any desired point in the cycle of alternating potential to regulate the average voltage of said load circuit.

6. In a feeder regulator system, an alternating current supply circuit, an alternating current load circuit, means for transmitting energy therebetween including a booster transformer provided with a series winding, said series winding being provided with a plurality of electrically spaced terminals, a plurality of electric valves interconnecting said terminals with said load circuit, and means for transferring the load current from a valve associated with a terminal of lower potential to a valve associated with a terminal of higher potential at any desired point in the cycle of alternating potential to regulate the average voltage of said load circuit.

7. In a feeder regulator system, an alternating current supply circuit, an alternating current load circuit, means for interconnecting said circuits including a transformer winding provided with a plurality of electrically spaced terminals, a pair of electric valves associated with each of two of said terminals and reversely connected in parallel, and means for transferring the load current from one of said valves to a valve of higher anode potential at any desired point in the cycle of alternating potential to regulate the average voltage of said load circuit.

8. In a feeder regulator system, an alternating current supply circuit, an alternating current load circuit, a booster transformer having a primary winding provided with a plurality of electrically spaced terminals and a secondary winding interconnecting said circuits, means for energizing said primary winding from said supply circuit including a pair of electric valves associated with each of certain of said terminals and reversely connected in parallel, and means for regulating the excitation of said booster transformer comprising means for transferring the load current of said transformer between the several valves at any desired point in the cycle of alternating potential.

9. In a feeder regulator system, an alternating current supply circuit, an alternating current load circuit, a series transformer provided with bucking and boosting primary windings and with a secondary winding interconnecting said circuits, means for energizing said primary windings from said supply circuit including a pair of electric valves associated with each and reversely connected in parallel, and means for regulating the average voltage of said series transformer comprising means for transferring the load current from the valves associated with said bucking winding to those associated with said boosting winding at any desired point in the cycle of alternating potential.

10. In a feeder regulator system, an alternating current supply circuit, an alternating current load circuit, an inductive winding for determining the relative potentials of said circuits, a plurality of electric valves interconnecting said circuits through said winding, and means responsive to an electrical condition of said load circuit for transferring the load current between said valves at such a point in the cycle of alternating potential as to maintain constant said electrical condition.

11. In a feeder regulator system, an alternating current supply circuit, a transformer winding provided with a plurality of electrically spaced terminals, a plurality of electric valves associated with certain of said terminals, and each provided with a control grid, an alternating current load circuit connected to said supply circuit through said winding and valves, means for exciting the control grid of a valve associated with a terminal of lower potential to render it conductive substantially only during its respective half cycles of positive anode potential and for exciting the control grid of a valve associated with a terminal of higher potential at any desired point in the cycle of alternating potential to regulate the average voltage of said load circuit.

12. In a feeder regulator system, an alternating current supply circuit, a transformer winding provided with a plurality of electrically spaced terminals, a plurality of electric valves associated with certain of said terminals and each provided with a control grid, an alternating current load circuit connected to said supply circuit through said winding and valves, means for exciting the control grid of a valve associated with a terminal of lower potential with an alternating potential substantially in phase with its anode potential and for exciting the control grid of a valve associated with a terminal of higher potential with an alternating potential variable in phase to regulate the average voltage of said load circuit.

13. In a feeder regulator system, an alternating current supply circuit, a transformer winding provided with a plurality of electrically spaced terminals, a plurality of electric valves associated with certain of said terminals and each provided with a control grid, an alternating current load circuit connected to said supply circuit through said winding and valves, means for impressing upon the control grid of a valve associated with a terminal of lower potential an alternating potential substantially in phase with its anode potential, means for impressing upon the control grid of a valve associated with a terminal of higher potential an alternating potential component substantially in phase with its anode potential and means for impressing upon the grid of said last mentioned valve a periodic positive potential variable in phase with respect to its anode potential to regulate the average voltage of said load circuit.

14. In a feeder regulator circuit, an alternating current supply circuit, a transformer winding provided with a plurality of electrically spaced terminals, a plurality of electric valves associated with certain of said terminals and each provided with a control grid, an alternating current load circuit connected to said supply circuit through said winding and valves, means for impressing upon the control grids of said valves alternating potentials slightly advanced in phase with respect to their anode potentials, and means for impressing upon the grid of a valve associated with a terminal of higher potential the positive half waves of an alternating potential variable in phase with respect to its anode potential to regulate the average voltage of said load circuit.

15. In a feeder regulator circuit, an alternating current supply circuit, a transformer winding provided with a plurality of electrically spaced terminals, a plurality of electric valves associated with certain of said terminals and each provided with a control grid, an alternating current load circuit connected to said supply circuit through said winding and valves, a grid circuit for each of said valves including a source of alternating potential slightly advanced in phase with respect to its anode potential, a source of alternating potential variable in phase in response to variations in an electrical condition of said load circuit, a resistor in the grid circuit of a valve associated with a terminal of higher potential, and a circuit including said resistor, a unilaterally conductive device, and said variable phase potential so connected that only the positive half waves thereof are impressed upon said last mentioned grid circuit.

16. In combination, an electric translating circuit including a source of alternating current and an electric valve provided with a control grid, and an excitation circuit for said grid including a source of alternating potential, a second source of alternating potential variable in phase, and means for suppressing the negative half waves of said second potential from said grid circuit.

17. In combination, an electric translating circuit including a source of alternating current and an electric valve provided with a control grid, an excitation circuit therefor including a source of alternating potential and a resistor, and a second excitation circuit including said resistor, a second source of alternating potential variable in phase and a unilaterally conductive device.

18. In a regulating system, a plurality of electric valves each provided with a control grid, a grid circuit for each of said valves including a source of alternating potential, and means for impressing upon the control grids of certain of said valves the positive half waves of a second alternating potential variable in phase with respect to that of said source and means for suppressing the negative half waves of said second source.

19. The method of operating an electric valve provided with a control grid in an alternating current circuit carrying a reactive current which comprises impressing an alternating potential upon said grid substantially in phase with its anode potential and impressing upon said grid the positive half waves of a second alternating potential variable in phase with respect to its anode potential.

20. The method of regulating the voltage of an alternating current feeder circuit energized from a supply circuit through a transformer provided with bucking and boosting windings which comprises energizing the bucking winding of said transformer during an initial portion of each half cycle of alternating potential and energizing the boosting winding during a later portion of each half cycle.

21. The method of regulating the voltage of an alternating current feeder circuit energized from a supply circuit through a transformer provided with bucking and boosting windings and a plurality of electric valves associated therewith which comprises rendering conductive a valve associated with said bucking winding during an initial portion of each half cycle of alternating potential and transferring the current therethrough to a valve associated with the boosting winding at an intermediate point of each half cycle.

22. The method of regulating the voltage of an alternating current feeder circuit energized from a supply circuit through a transformer provided with bucking and boosting windings and a plurality of electric valves associated therewith which comprises rendering conductive a valve associated with said bucking winding during an initial portion of each half cycle of alternating potential, rendering conductive a valve associated with the boosting winding at an intermediate point of each half cycle, transferring the current from said first valve to said second valve, and varying the point in each half cycle at which current is transferred between said valves in accordance with an electrical condition of said feeder circuit.

In witness whereof I have hereunto set my hand.

BURNICE D. BEDFORD.